UNITED STATES PATENT OFFICE.

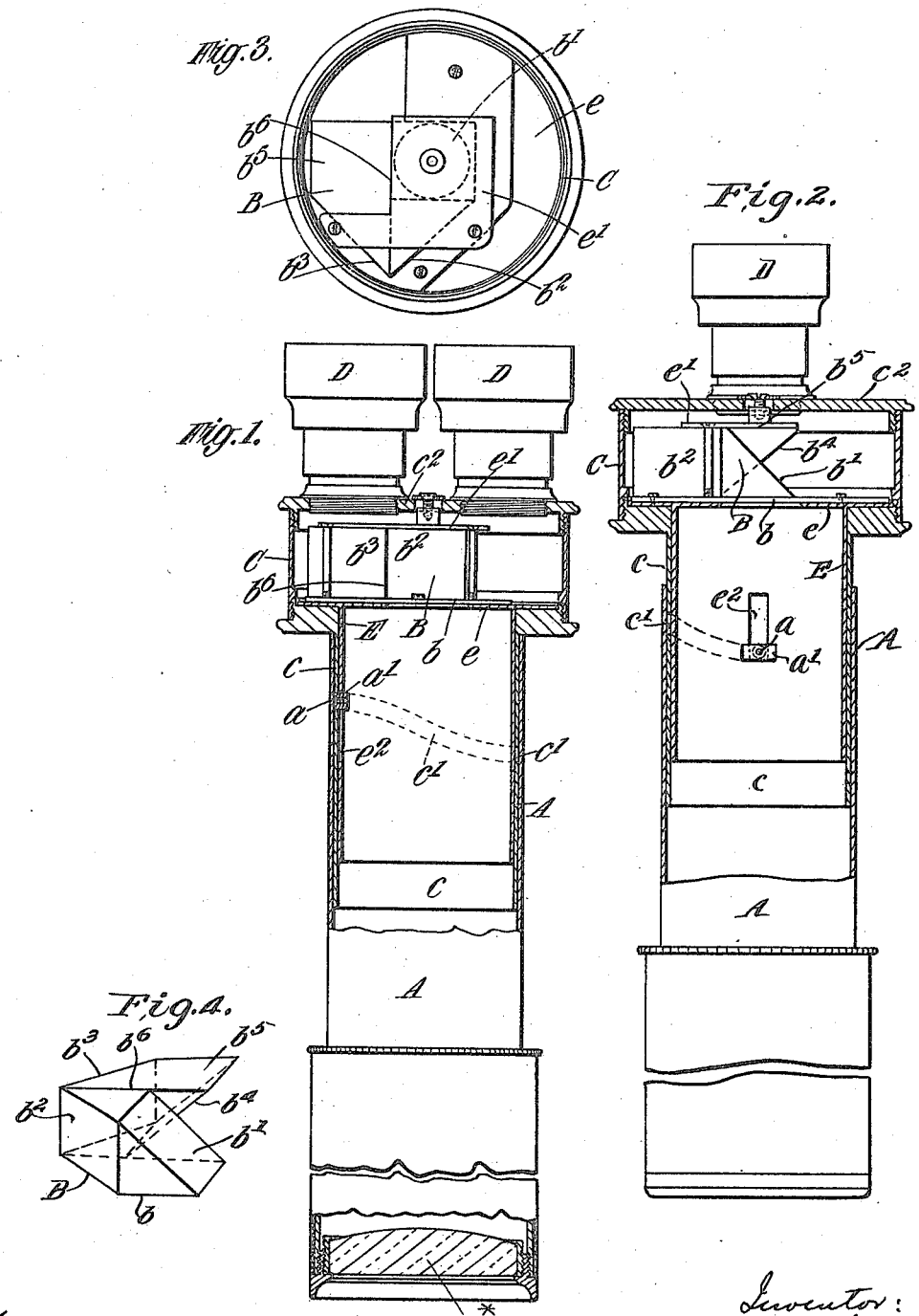

ALBERT EDWARD COOKE, OF KENTISH TOWN, LONDON, ENGLAND, ASSIGNOR TO THE PERISCOPIC PRISM COMPANY, LIMITED, OF LONDON, ENGLAND.

CONSTRUCTION OF TELESCOPES.

1,187,818.      Specification of Letters Patent.      Patented June 20, 1916.

Application filed July 18, 1914. Serial No. 851,803.

*To all whom it may concern:*

Be it known that I, ALBERT EDWARD COOKE, a subject of the King of Great Britain, residing at 23 Prince of Wales Crescent, Kentish Town, in the county of London, England, have invented certain new and useful Improvements in the Construction of Telescopes, of which the following is a specification.

This invention relates to the construction of telescopes and its chief object is to provide an improved arrangement permitting of two or more powers of magnification.

In the improved telescope a light deflecting device, such as a prism, is placed with its entrance surface in alinement with the optical axis of the objective and its emergent or exit surface located to one side of the axis, a plurality of eye-pieces being so mounted as to enable any one to be brought, by rotation around the said axis, into alinement with the said exit surface.

The prism is mounted in any convenient manner in a box on the end of the telescope tube. This box may be cylindrical and carries two or more eyepieces of different powers either one of which can be brought over the emergent face of the prism; if it is desired to make the eyepiece tubes of equal length I may provide a scroll slot and pin or equivalent adjustment for the body tube so that by turning the tube in one direction or the other, either after changing the eyepiece or preferably by the same movement, the object glass is brought immediately from correct position for the original eyepiece to the correct position for the new one without necessitating special adjustment by observation.

In order that the said invention may be clearly understood and readily carried into effect we will now describe the same more fully with reference to the accompanying drawings, in which:—

Figure 1 is a longitudinal section through the upper part of a telescope with two eyepieces, one of which is in viewing position. Fig. 2 is a longitudinal section showing the telescope adjusted to bring the second eyepiece into position and taken at right angles to Fig. 1. Fig. 3 is a plan of the prism, shown in the prism box with the eyepieces and cover removed. Fig. 4 is a perspective view of the prism alone.

A is the telescope or body tube with object glass at $a^*$.

B is the prism inclosed in the box C.

D, D are the eyepieces.

Referring to the double eyepiece telescope shown in Figs. 1 to 3, the box C is provided with a tubular extension $c$ which fits in the telescope tube A, and is connected to it by the screw pin $a$ and block $a'$ passing through the spiral slot $c'$ in the extension $c$, which allows the tube to be turned through a semicircle around the box extension, at the same time causing an extension or contraction of the tube according to the eyepiece which is brought into viewing position by the movement. A slightly shorter tube length is required for the more powerful eyepiece and the slot $c'$ is so proportioned that the alteration in length is made automatically by the change from one eyepiece to the other when, as shown, the eyepieces themselves are made of equal projection from the box C.

Since the eyepieces D are carried by the cover plate $c^2$ of the box C they do not move with the telescope tube and the prism B must therefore be attached to the tube in a non-rotatory manner, so as to move with it for change of eyepiece, or to remain stationary with the tube if the box is regarded as the moving element. For this purpose the prism is mounted on the inner tube E through the diaphragm plate $e$, which lies in the bottom of the box C, a clamping plate $e'$ gripping the upper face of the prism at the surfaces through which no light is intended to emerge. The tube E is connected to the body tube A by the block $a'$ and screw $a$, which block passes through the short longitudinal slot $e^2$ in the tube E as well as through the spiral slot $c'$ in the tubular extension $c$ of the box C. The slot $e^2$ allows of longitudinal movement between the tubes A and E so that the latter tube, together with the prism B, does not shift longitudinally with relation to the box C. Or the prism B may be fixed in the box C and the cover plate $c^2$ with the eyepieces D turned on the box, in which case the adjustment of tube length by the slot $c'$ would be given a separate turn of the tube.

Referring to the form of the prism B (shown separately in perspective in Fig. 4) it will be seen that the entering face $b$ is placed centrally or directly over the telescope axis, the light which enters the prism axially striking first against the total reflection surface $b'$ at an angle of 45° to the face $b$, and being thus deflected into a plane at right angles to the axis. In this plane it meets the two intermediate total reflection surfaces $b^2$, $b^3$ at right angles to each other and parallel to the axis, the beam of light now being reversed but still in the transverse plane. On meeting the final total reflection surface $b^4$, which is at right angles to the first reflecting surface $b'$, the light is deflected again into the axial direction but at one side of the telescope axis, emerging from the final or emergent face $b^5$ into the eyepiece D which is at the moment situated over the face $b^5$. Both the eyepieces are separately adjustable in length according to the sight of the telescope user, in a manner already known.

If the beam of light and the formation of the image are traced through these successive reflections it will be seen that the image is inverted or erected and the eyepiece D may be of any simple or non-erecting type so that the space required for erecting lenses is saved, effecting a substantial decrease in the length of the telescope. The chief increase in the light path, obtained without increasing the telescope length, is of course due to the lateral portion of the path within the prism B, and as this portion is through glass its effective length, as compared with the path through air, is increased in proportion to the refractive index of the glass.

The prism above described can be made conveniently in two similar halves, each having two total reflection surfaces $b'$, $b^2$ and $b^3$, $b^4$, respectively and an optically ground meeting surface $b^6$, the two parts being cemented together along their meeting surfaces in inverted position, so that the transverse faces through which the light enters and emerges are at opposite sides. A prism of this kind requires no adjustment beyond placing the first transverse face on the plate $e$ immediately over the aperture and arranging the second transverse face below the eyepiece, all the total reflection surfaces and the entering and emerging faces having already been adjusted accurately with relation to each other in making the prism.

By making the body tube A in two or more telescopic parts the telescope can be collapsed into a very short compass, and even when extended the telescope is so short that for powers of 25 diameters or thereabout it can be held easily by one hand for observation purposes and the change of eyepiece and adjustment may also be made without using the other hand. The telescope is therefore especially adapted for army field work.

What I claim and desire to secure by Letters Patent of the United States is:—

1. In a telescope, an objective, a plurality of eye-pieces, a body tube, a light deflecting device fixed relatively to the body tube and having its entrance surface in alinement with the optical axis of the objective and its emergent surface located to one side of said axis, and a mounting for the said eyepieces adapted to turn on the said body tube and bring any one of the eye-pieces into alinement with the emergent facing of the said light deflecting device.

2. In a telescope, an objective, a plurality of eye-pieces, a body tube, a light deflecting device fixed relative to said body tube and having its entrance surface in alinement with the optical axis of said objective and a box inclosing the said light deflecting device and mounted to turn on said body tube, the relative movements of said box and tube enabling any one of the eye-pieces to be brought over the emergent face of the light deflecting device.

3. In a telescope, an objective, a plurality of eye-pieces of different powers, a body tube, a light deflecting device fixed relatively to the body tube and having its entrance surface in alinement with the optical axis of the objective, a box inclosing the said light deflecting device and mounted to turn on the said body tube, and means depending upon the changing of the eye-pieces for adjusting the optical relation of the objective and the new eye-piece.

In testimony whereof I affix my signature in presence of two witnesses.

ALBERT EDWARD COOKE.

Witnesses:
A. M. GLASS,
T. SELBY WARDLE.